US010496730B2

(12) United States Patent
Mizoguchi

(10) Patent No.: US 10,496,730 B2
(45) Date of Patent: Dec. 3, 2019

(54) FACTOR ANALYSIS DEVICE, FACTOR ANALYSIS METHOD, AND FACTOR ANALYSIS PROGRAM

(71) Applicant: NEC Corporation, Tokyo (JP)

(72) Inventor: Takehiko Mizoguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 15/125,302

(22) PCT Filed: Dec. 15, 2014

(86) PCT No.: PCT/JP2014/006232
§ 371 (c)(1),
(2) Date: Sep. 12, 2016

(87) PCT Pub. No.: WO2015/136586
PCT Pub. Date: Sep. 17, 2015

(65) Prior Publication Data
US 2017/0109324 A1  Apr. 20, 2017

(30) Foreign Application Priority Data

Mar. 14, 2014 (JP) ................. 2014-051096

(51) Int. Cl.
*G06F 17/18* (2006.01)
*G06K 9/00* (2006.01)
(Continued)

(52) U.S. Cl.
CPC ......... *G06F 17/18* (2013.01); *G06K 9/00496* (2013.01); *G06N 5/045* (2013.01); *G07C 3/14* (2013.01); *Y02P 90/22* (2015.11)

(58) Field of Classification Search
None
See application file for complete search history.

(56) References Cited

U.S. PATENT DOCUMENTS

2005/0209820 A1* 9/2005 Inoue ................ G05B 23/0232
702/183
2006/0015263 A1* 1/2006 Stupp .................... G06F 17/18
702/19
(Continued)

FOREIGN PATENT DOCUMENTS

JP  2002-110493 A  4/2002
JP  2006-318263 A  11/2006
(Continued)

OTHER PUBLICATIONS

International Search Report corresponding to PCT/JP2014/006232 dated Feb. 10, 2015 (one page).
(Continued)

*Primary Examiner* — Mohamed Charioui
*Assistant Examiner* — Terence E Stifter, Jr.
(74) *Attorney, Agent, or Firm* — Wilmer Cutler Pickering Hale and Dorr LLP

(57) ABSTRACT

This factor analysis device is provided with a feature extraction unit (1021) that extracts feature quantities from an explanatory time series, a feature conversion unit (1022) that converts said feature quantities to a feature time series, a feature-time-series influence-degree computation unit (1031) that uses said feature time series and a response time series to compute an influence degree indicating the degree to which the feature time series influences the change over time represented by the response time series, and an explanatory-time-series influence-degree computation unit (1032) that uses said influence degree to compute an influence degree indicating the degree to which the explanatory time series influences the change over time represented by the response time series.

9 Claims, 10 Drawing Sheets

(51) Int. Cl.
*G06N 5/04* (2006.01)
*G07C 3/14* (2006.01)

(56) References Cited

U.S. PATENT DOCUMENTS

| | | | |
|---|---|---|---|
| 2011/0112998 A1 | 5/2011 | Abe et al. | |
| 2012/0083917 A1* | 4/2012 | Zhou | G05B 13/048 |
| | | | 700/110 |
| 2013/0310660 A1* | 11/2013 | Zuckerman-Stark | |
| | | | G16H 50/30 |
| | | | 600/301 |

FOREIGN PATENT DOCUMENTS

| | | | |
|---|---|---|---|
| JP | 2009-258890 A | 11/2009 | |
| JP | 2009-301341 A | 12/2009 | |

OTHER PUBLICATIONS

ISBN: 1-58113-838-5, Andrew Y. Ng, "Feature selection, L1 vs. L2 regularization, and rotational invariance," in Proceedings of the 21st International Conference of Machine Learning, pp. 78-85, 2004 (8 pages).

ISSN: 0885-6125, Breiman. L, "Random Forests," Machine Learning, vol. 45, No. 1, pp. 5-32, 2001.

Eiji Motohashi, et al. An Analysis of Purchase History Data by a Brand Choice Model Considering the Change of Market Structure, Journal of Marketing Science, Mar. 28, 2013, vol. 21 No. 1, pp. 37-59.

\* cited by examiner

Fig.7

METHOD I

| ORDER | FEATURE QUANTITY | INFLUENCE DEGREE |
|---|---|---|
| 1 | a::37 | 0.77325 |
| 2 | a::13 | 0.605645 |
| 3 | e::37 | 0.267599 |
| 4 | e::13 | 0.068993 |
| 5 | g::13 | 0.000449 |
| 6 | c::37 | 0.000173 |
| 7 | d::37 | 2.98E-05 |
| 8 | b::37 | 1.58E-05 |
| 9 | d::13 | 3.42E-07 |
| 10 | h::37 | 1.31E-07 |

METHOD II

| ORDER | FEATURE QUANTITY | INFLUENCE DEGREE |
|---|---|---|
| 1 | b::37 | 0.999989 |
| 2 | g::13 | 0.997699 |
| 3 | g::37 | 0.916765 |
| 4 | i::13 | 0.83455 |
| 5 | e::37 | 0.145366 |
| 6 | b::13 | 0.125114 |
| 7 | e::13 | 0.006468 |
| 8 | f::13 | 0.005219 |
| 9 | f::37 | 0.003097 |
| 10 | i::25 | 0.001407 |

METHOD III

| ORDER | FEATURE QUANTITY | INFLUENCE DEGREE |
|---|---|---|
| 1 | a::13 | 0.950364 |
| 2 | a::37 | 0.878053 |
| 3 | g::13 | 0.544676 |
| 4 | e::37 | 0.527204 |
| 5 | e::13 | 0.526311 |
| 6 | d::37 | 0.506589 |
| 7 | b::37 | 0.423266 |
| 8 | d::13 | 0.414557 |
| 9 | i::13 | 0.321814 |
| 10 | c::37 | 0.31774 |

Fig.8

METHOD I

| ORDER | TIME SERIES | INFLUENCE DEGREE |
|---|---|---|
| 1 | 37 | 1.041067 |
| 2 | 13 | 0.675087 |
| 3 | 38 | 4.04E-07 |
| 4 | 39 | 4.04E-07 |
| 5 | 41 | 4.04E-07 |

METHOD II

| ORDER | TIME SERIES | INFLUENCE DEGREE |
|---|---|---|
| 1 | 37 | 2.066859 |
| 2 | 13 | 1.972295 |
| 3 | 25 | 0.002686 |
| 4 | 32 | 0.002458 |
| 5 | 21 | 0.00199 |

METHOD III

| ORDER | TIME SERIES | INFLUENCE DEGREE |
|---|---|---|
| 1 | 13 | 3.444739 |
| 2 | 37 | 2.966693 |
| 3 | 7 | 0.122848 |
| 4 | 32 | 0.047575 |
| 5 | 27 | 0.042818 |

Fig.9

| ORDER | TIME SERIES | INFLUENCE DEGREE |
|---|---|---|
| 1 | 13 | 6.092121 |
| 2 | 37 | 6.074618 |
| 3 | 7 | 0.122848 |
| 4 | 32 | 0.050033 |
| 5 | 27 | 0.042818 |

FACTOR ANALYSIS DEVICE, FACTOR ANALYSIS METHOD, AND FACTOR ANALYSIS PROGRAM

CROSS-REFERENCE TO RELATED APPLICATIONS

This application is a national stage application of International Application No. PCT/JP2014/006232 entitled "Factor Analysis Device, Factor Analysis Method, and Factor Analysis Program" filed on Dec. 15, 2014, which claims priority to Japanese Application No. 2014-051096 filed on Mar. 14, 2014, the disclosures of which are hereby incorporated by reference in their entirety.

TECHNICAL FIELD

The present invention relates to a factor analysis device, a factor analysis method, and a factor analysis program, and particularly, relates to a factor analysis device, a factor analysis method, and a factor analysis program that identify an explanatory time series that has an influence on a change in value of a response time series.

BACKGROUND ART

Statistical methods by regression analysis or the like are widely used in quality management of a manufacturing process or the like as a technique of elucidating relationships between a response variable and explanatory variables and identifying an explanatory variable that strongly influences the value of the response variable.

For example, a factor identification method that identifies an explanatory time series that influences a change in value of a response time series is used in a production process to identify a sensor observation value that influences the results of quality tests and the like of manufactured goods. A majority of analysis methods, represented by regression analysis, are methods of multidimensionally analyzing observation data on the premise of availability of data that is observed by measurement instruments, such as sensors.

PTL 1 describes a method of identifying an influence factor by segmenting data based on nominal scale data when explanatory variables include the nominal scale data and using a multivariate analysis method for each segment.

PTL 2 describes a quality variation cause analysis method of a production line, which repeats operation of dividing a plurality of explanatory variables and narrowing down the explanatory variables by performing multiple linear regression analysis for all division groups.

NPL 1 describes a method, called L1 regularized logistic regression, which can estimate influence degrees of explanatory variables with high precision when a response variable is a discrete value.

NPL 2 describes a random forest classifier that is a classifier implemented using a plurality of decision trees. The techniques described in PTL 1 and 2 and NPL 1 and 2 are also used in factor analysis.

CITATION LIST

Patent Literature

[PTL 1] Japanese Unexamined Patent Application Publication No. 2009-258890
[PTL 2] Japanese Unexamined Patent Application Publication No. 2002-110493

Non Patent Literature

[NPL 1] ISBN: 1-58113-838-5, Andrew Y. Ng, "Feature selection, L1 vs. L2 regularization, and rotational invariance," in Proceedings of the 21st International Conference of Machine Learning, pp. 78-85, 2004
[NPL 2] ISSN: 0885-6125, Breiman. L, "Random Forests," Machine Learning, Vol. 45, No. 1, pp. 5-32, 2001

SUMMARY OF INVENTION

Technical Problem

Data observed in a production process or the like often includes observation values that vary frequently due to factors such as noise. Thus, data analysis is often difficult when a factor analysis method that uses such as the multivariate analysis described in PTL 1 is used as is for the observation data.

When using observation values that are difficult to analyze as the originally observed values for analysis, preprocessing, such as, smoothing data by moving average, is performed on the observation values.

For performing preprocessing on the observation values, it is difficult to objectively determine what kind of preprocessing should be performed on the observation values to improve analysis accuracy. This is because appropriate preprocessing that should be applied to the observation values is often subjectively determined based on prior knowledge or the analysis results of performed analysis. Thus, the desired is a method with which even those who do not know what is appropriate preprocessing for the observation values can analyze observation values by appropriate preprocessing.

Accordingly, the objective of the present invention is to provide a factor analysis device, a factor analysis method, and a factor analysis program that elucidate appropriate preprocessing to be applied to an explanatory time series of an analysis subject and identify the explanatory time series relating to a change in value of a response time series.

Solution to Problem

A factor analysis device according to the present invention includes: a feature extraction unit that extracts feature quantities from an explanatory time series; a feature conversion unit that converts the feature quantities into a feature time series; a feature-time-series influence-degree computation unit that computes, from the feature time series and a response time series, an influence degree of the feature time series on a change in value of the response time series; and an explanatory-time-series influence-degree computation unit that computes, based on the influence degree, an influence degree of the explanatory time series on a change in value of the response time series.

A factor analysis method according to the present invention includes: extracting feature quantities from an explanatory time series; converting the feature quantities into a feature time series; computing, from the feature time series and a response time series, an influence degree of the feature time series on a change in value of the response time series; and computing, based on the influence degree, an influence degree of the explanatory time series on a change in value of the response time series.

A factor analysis program according to the present invention causes a computer to execute: feature extraction processing of extracting feature quantities from an explanatory time series; feature conversion processing of converting the feature quantities into a feature time series; feature-time-series influence-degree computation processing of computing, from the feature time series and a response time series, an influence degree of the feature time series on a change in value of the response time series; and explanatory-time-series influence-degree computation processing of computing, based on the influence degree, an influence degree of the explanatory time series on a change in value of the response time series.

Advantageous Effects of Invention

According to the present invention, appropriate preprocessing to be applied to an explanatory time series of an analysis subject can be elucidated and an explanatory time series relating to a change in value of a response time series can be identified.

BRIEF DESCRIPTION OF DRAWINGS

FIG. 7 is an explanatory diagram depicting computed examples of influence degrees of feature time series on a response time series by a feature-time-series influence-degree computation unit 1031 using a plurality of multivariate analysis methods.

FIG. 8 is an explanatory diagram depicting computed examples of influence degrees of explanatory time series on a response time series by an explanatory-time-series influence-degree computation unit 1032.

FIG. 9 is an explanatory diagram depicting a computed example of influence degrees of an explanatory time series on a response time series by a factor output unit 104.

DESCRIPTION OF EMBODIMENTS

The following will describe an exemplary embodiment of the present invention with reference to the drawings.

In the present exemplary embodiment, as an example, a case where a factor analysis device is applied to quality management in a manufacturing process is described. The factor analysis device may be applied to a process other than a manufacturing process or a business other than quality management in a manufacturing process. In the present exemplary embodiment, one kind of response time series of an analysis subject is considered. There may be one or more kinds of response time series of an analysis subject.

Figure 1:
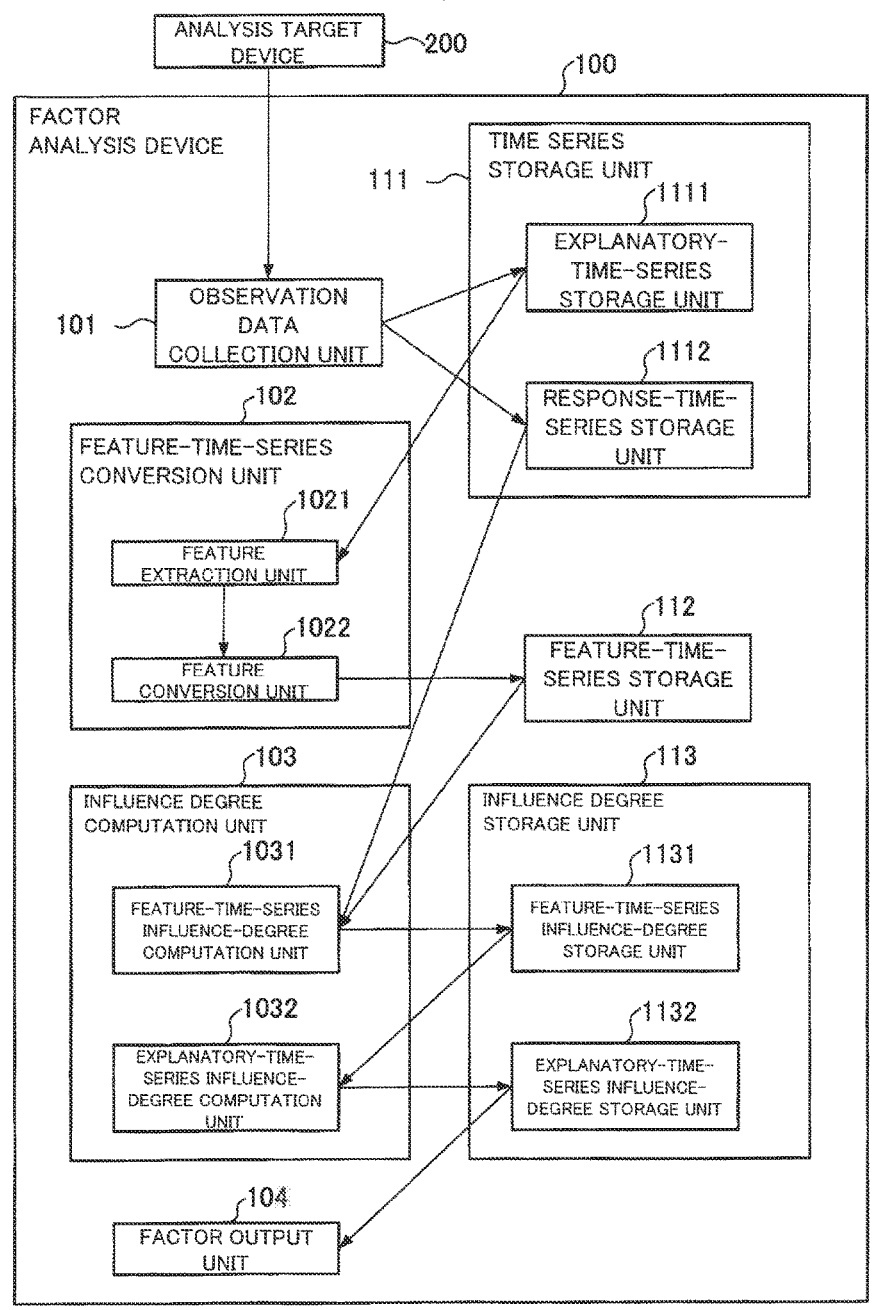
FIG. 1 is a block diagram depicting a configuration example of a factor analysis device according to the present invention.

FIG. 1 is a block diagram depicting a configuration example of a factor analysis device according to the present invention. As depicted in FIG. 1, the process where the factor analysis device 100 is used in the present exemplary embodiment is linked to a manufacturing process where two or more analysis target devices 200 are used. The analysis target device 200 is a device used in the manufacturing process.

The analysis target device 200 measures a plurality of types of measurement values relating to the analysis target device 200 itself at predetermined time intervals, and transmits the measurement values to the factor analysis device 100. The types of observation values include one or more quality indexes and one or more production conditions of manufactured products. The production conditions include, for example, temperatures, pressures, and gas flow rates. The production conditions are expressed by, for example, numerical values such as integer and decimal. The quality indexes are represented by, for example, numerical values such as integer and decimal. The quality indexes may be represented by a code indicating "abnormal", "normal" or the like.

In the present exemplary embodiment, a "time series" is data where numerical values measured by a sensor are arranged in time order with predetermined time intervals. An "explanatory time series" is a time series that can be obtained by arranging observation values representing production conditions measured by each of the analysis target devices 200 in time order. The explanatory time series widely include production conditions indicating operation conditions of a device, such as adjustment values, temperatures, pressures, gas flow rates, and voltages of the device.

A "response time series" is a time series that can be obtained by arranging observation values representing quality indexes measured by each of the analysis target devices 200 in time order. While one kind of response time series of an analysis subject is considered in the present exemplary embodiment, response time series may widely include evaluation indexes of manufactured products or the like, which can be obtained when a device is operated under the production conditions represented by explanatory time series, such as quality and yields.

The factor analysis device 100 depicted in FIG. 1 includes an observation data collection unit 101, a feature-time-series conversion unit 102, an influence degree computation unit 103, a factor output unit 104, a time series storage unit 111, a feature-time-series storage unit 112, and an influence degree storage unit 113.

The observation data collection unit 101 has a function of obtaining observation values from the analysis target device 200. The observation data collection unit 101 stores the obtained observation values in the time series storage unit 111.

The time series storage unit 111 has a function of storing the observation values obtained by the observation data collection unit 101 as time series data. The time series storage unit 111 includes an explanatory-time-series storage unit 1111 and a response-time-series storage unit 1112.

The explanatory-time-series storage unit 1111 stores observation values relating to the production conditions from among the observation values obtained by the observation data collection unit 101 as explanatory time series.

The response-time-series storage unit 1112 stores observation values relating to the quality indexes from among the observation values obtained by the observation data collection unit 101 as response time series.

The feature-time-series conversion unit 102 has a function of retrieving explanatory time series from the explanatory-time-series storage unit 1111 and converting feature quantities extracted from the explanatory time series into a feature time series. The feature-time-series conversion unit 102 includes a feature extraction unit 1021 and a feature conversion unit 1022.

The feature extraction unit 1021 retrieves a partial time series that is a predetermined time range portion of an explanatory time series from the explanatory-time-series storage unit 1111, and extracts a feature quantity from the retrieved partial time series. The details of a method of retrieving a partial time series and a method of extracting a feature quantity will be described later.

The feature conversion unit 1022 converts the feature quantities extracted by the feature extraction unit 1021 into a feature time series by arranging the feature quantities in time order. The feature conversion unit 1022 stores the generated feature time series in the feature-time-series storage unit 112.

The feature-time-series storage unit 112 has a function of storing the feature time series generated by the feature-time-series conversion unit 102.

The influence degree computation unit 103 has a function of retrieving feature time series from the feature-time-series storage unit 112 and a response time series from the response-time-series storage unit 1112, and computing an influence degree of the explanatory time series on a change in value of the response time series based on the retrieved data. The influence degree computation unit 103 includes a feature-time-series influence-degree computation unit 1031 and an explanatory-time-series influence-degree computation unit 1032.

The feature-time-series influence-degree computation unit 1031 retrieves feature time series from the feature-time-series storage unit 112 and a response time series from the response-time-series storage unit 1112. The feature-time-series influence-degree computation unit 1031 computes, for each of the retrieved feature time series by using one or more multivariate analysis methods, influence degrees of the feature time series on the response time series. The number of the computed influence degrees is as much as the number of the used multivariate analysis methods for each of the retrieved feature time series. The details of a method of computing an influence degree of a feature-time-series will be described later. The feature-time-series influence-degree computation unit 1031 stores the computed influence degrees of the feature time series in a feature-time-series influence-degree storage unit 1131.

The explanatory-time-series influence-degree computation unit 1032 retrieves the influence degrees of feature time series each correlated with the one or more multivariate analysis methods from the feature-time-series influence-degree storage unit 1131. The explanatory-time-series influence-degree computation unit 1032 computes an influence degree of an explanatory time series on the response time series from the retrieved influence degrees of the feature time series based on the information of the explanatory time series as the extraction source of the feature quantities. The details of a method of computing an influence degree of an explanatory time series will be described later. The explanatory-time-series influence-degree computation unit 1032 stores the computed influence degree of the explanatory time series in an explanatory-time-series influence-degree storage unit 1132.

The influence degree storage unit 113 has a function of storing the influence degrees of the feature time series and the influence degrees of the explanatory time series that are computed by the influence degree computation unit 103. The influence degree storage unit 113 includes the feature-time-series influence-degree storage unit 1131 and the explanatory-time-series influence-degree storage unit 1132.

The feature-time-series influence-degree storage unit 1131 stores the influence degrees of the feature time series computed by the feature-time-series influence-degree computation unit 1031.

The explanatory-time-series influence-degree storage unit 1132 stores the influence degrees of the explanatory time series computed by the explanatory-time-series influence-degree computation unit 1032.

The factor output unit 104 has a function of retrieving the influence degrees of explanatory time series from the explanatory-time-series influence-degree storage unit 1132 in descending order of the influence degrees and outputting explanatory time series corresponding to the retrieved influence degrees of the explanatory time series as factor candidates that influence a change in value of the response time series. The factor output unit 104 has a function of retrieving the influence degrees of feature time series from the feature-time-series influence-degree computation unit 1031 in descending order of the influence degrees and outputting feature quantities corresponding to the retrieved influence degrees of the feature time series as candidates of processing subjects in preprocessing.

The factor analysis device 100 in the present exemplary embodiment is implemented, for example, using a Central Processing Unit (CPU) that executes processing in accordance with a program. The factor analysis device 100 may be implemented using a computer that includes a CPU and a recording medium storing a program and operates by control of the CPU in accordance with the program.

The observation data collection unit 101, the feature-time-series conversion unit 102, the influence degree computation unit 103, and the factor output unit 104 are implemented, for example, using the CPU that executes processing in accordance with a program control.

The time series storage unit 111, the feature-time-series storage unit 112, and the influence degree storage unit 113 are implemented, for example, using a Random Access Memory (RAM). The time series storage unit 111, the feature-time-series storage unit 112, and the influence degree storage unit 113 may be implemented using one storage medium or a plurality of storage mediums.

Figure 2:
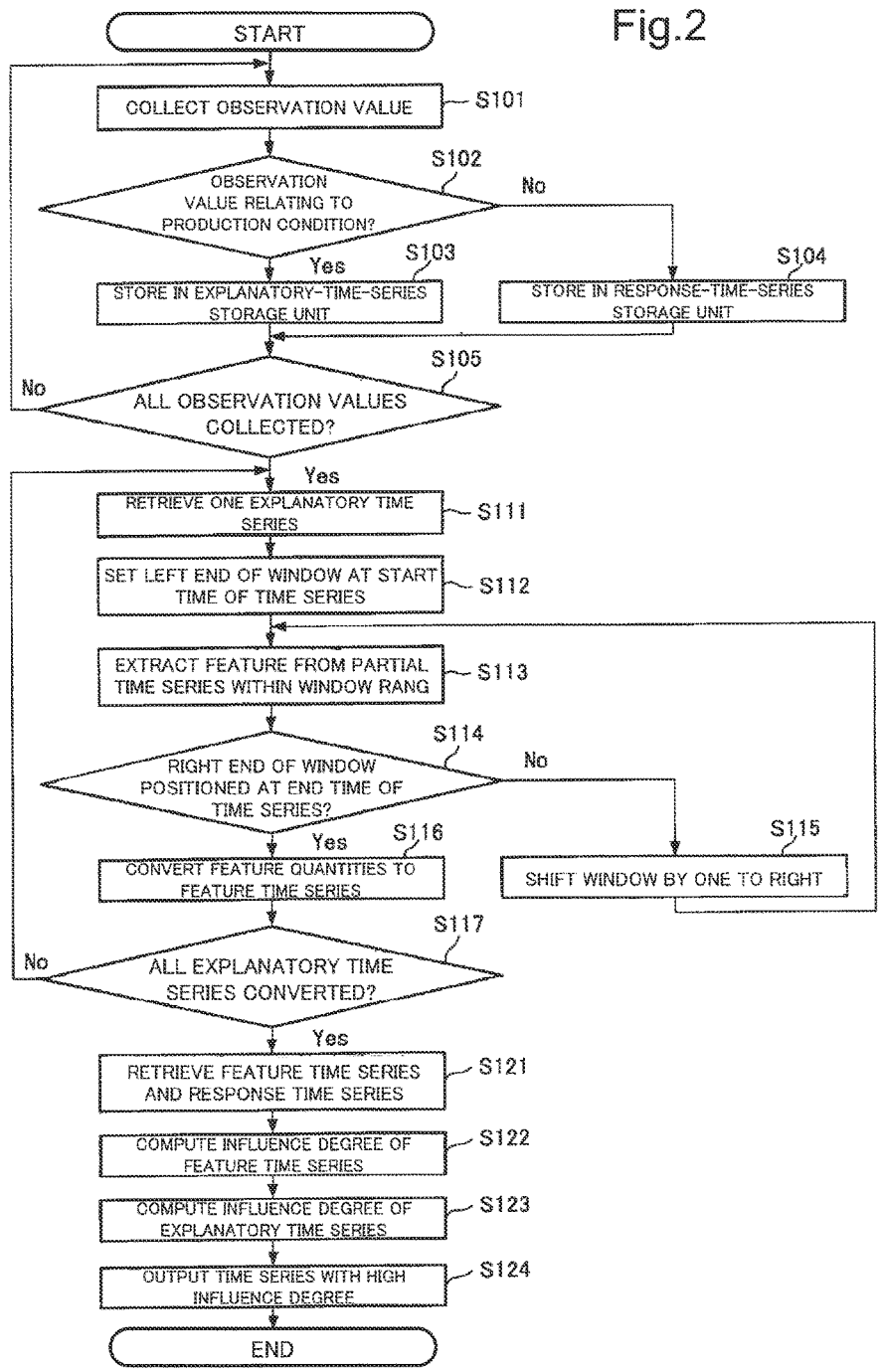
FIG. 2 is a flowchart depicting the operation of a factor analysis device 100.

The following will describe the operation of the factor analysis device 100 according to the present exemplary embodiment. FIG. 2 is a flowchart depicting the operation of the factor analysis device 100.

The observation data collection unit 101 of the factor analysis device 100 collects sensor observation values from the analysis target devices 200 (step S101).

The observation data collection unit 101 determines whether the sensor observation value is an observation value relating to production conditions or an observation value relating to quality indexes (step S102).

If the sensor observation value is an observation value relating to production conditions (YES at step S102), the observation data collection unit 101 stores the observation value in the explanatory-time-series storage unit 1111 of the time series storage unit 111 (step S103). If the sensor observation value is an observation value relating to quality indexes (NO at step S102), the observation data collection unit 101 stores the observation value in the response-time-series storage unit 1112 (step S104).

The observation data collection unit 101 determines whether all sensor observation values is collected from the analysis target devices 200 (step S105). If there is still uncollected sensor observation values (NO at step S105), the observation data collection unit 101 repeats the processing from step S101. If all sensor observation values is collected (YES at step S105), the observation data collection unit 101 proceeds the processing to step S111.

If all sensor observation values is collected (YES at step S105), the feature extraction unit 1021 selects one explanatory time series, of which feature quantity is not extracted yet, stored in the explanatory-time-series storage unit 1111, and retrieves the selected explanatory time series (step S111). Next, the feature extraction unit 1021 arranges the left end of the window, in which a partial time series as a subject of extracting a feature quantity is set, at a time series start time (step S112).

In the present exemplary embodiment, the range of time, for which a time series is retrieved, is referred to as a "window." The feature extraction unit 1021 extracts a feature quantity from the partial time series within the range of the window (step S113).

The feature extraction unit 1021 determines whether the right end of the window reaches the end time of the explanatory time series (step S114). If not reached (NO at step S114), the feature extraction unit 1021 moves the window by one time point to right, that is, toward the end time (step S115). After moving the window, the feature extraction unit 1021 returns to the processing of step S113. The feature extraction unit 1021 repeats the processing of steps S113 to S115 until the right end of the window reaches the end time of the explanatory time series.

When the right end of the window reaches the end time of the explanatory time series (YES at step S114), the feature conversion unit 1022 converts feature quantities extracted by the feature extraction unit 1021 into a feature time series by arranging the feature quantities in time order. Then, the feature conversion unit 1022 stores the generated feature time series in the feature-time-series storage unit 112 (step S116).

Next, the feature-time-series conversion unit 102 determines whether feature time series is generated from all the explanatory time series stored in the explanatory-time-series storage unit 1111 (step S117). When there is an explanatory time series, of which feature time series is not generated (NO at step S117), the feature-time-series conversion unit 102 repeats the processing of steps S111 to S116. When feature time series is generated from all the explanatory time series (YES at step S117), the feature-time-series conversion unit 102 proceeds to the processing of step S121.

When feature time series is generated from all the explanatory time series (YES at step S117), the feature-time-series influence-degree computation unit 1031 retrieves a response time series from the response-time-series storage unit 1112 and feature time series from the feature-time-series storage unit 112 respectively (step S121). Next, the feature-time-series influence-degree computation unit 1031 computes influence degrees of the feature time series on the response time series using one or more multivariate analysis methods (step S122). The feature-time-series influence-degree computation unit 1031 stores the computed influence degree of the feature time series in the feature-time-series influence-degree storage unit 1131.

The explanatory-time-series influence-degree computation unit 1032 retrieves the influence degrees of feature time series, which are influence degree of the feature time series on the response time series, from the feature-time-series influence-degree storage unit 1131. Then, the explanatory-time-series influence-degree computation unit 1032 computes an influence degree of the explanatory time series on the response time series based on the information of the explanatory time series as the extraction source of the feature quantities (step S123). The explanatory-time-series influence-degree computation unit 1032 stores the computed influence degree of the explanatory time series in the explanatory-time-series influence-degree storage unit 1132.

The factor output unit 104 integrates the results of the influence degrees of the explanatory time series stored in the explanatory-time-series influence-degree storage unit 1132. The factor output unit 104 outputs an explanatory time series, of which integrated influence degree is high, as an influence factor (step S124). In this way, the factor analysis device 100 according to the present exemplary embodiment ends the processing.

While one response time series is assumed as an analysis subject in the present exemplary embodiment, there may be a plurality of response time series of the analysis subject. If there are a plurality of response time series, the factor analysis device 100 can identify respective explanatory time series that influence the response time series by performing the processing of FIG. 2 for each of the response time series separately.

While, in the present exemplary embodiment, the feature extraction unit 1021 moves a window used for extracting a feature quantity from the explanatory time series to right by one time point, the feature extraction unit 1021 may move the window to right by two or more time points at once. If the window is shifted to right by t time points at once, feature quantities at (T−w)/t points are extracted from one explanatory time series. Here, T is the number of all the time points, w is the number of time points for reading, and t is the number of time points for shifting.

In the present exemplary embodiment, the feature extraction unit 1021 may use any kind of feature quantity for feature quantities extracted from the explanatory time series. When extracting a feature quantity from a partial time series that is cut out by a window, the feature extraction unit 1021 can use, as a feature quantity to be extracted, basic statistics, such as average and variance, an autoregression coefficient, a frequency distribution, a correlation coefficient with other partial time series, and the like.

The basic statistics is computed from a value at each time point in a partial time series. The autoregression coefficient is computed by using an autoregression model for a partial time series and fitting the partial time series by a least squares method or the like. The frequency distribution is computed by performing Fast Fourier Transform (FFT) on a partial time series and extracting frequency components. The correlation coefficient with other partial time series is computed by calculating a correlation coefficient with a partial time series that is cut out from other explanatory time series in the corresponding window.

In the present exemplary embodiment, the feature-time-series influence-degree computation unit 1031 may use any kind of method as a multivariate analysis method, as long as the method computes an influence degree of an explanatory variable on a change in a value of a response variable.

If a response variable is an index indicated by a code instead of a numerical value, the feature-time-series influence-degree computation unit 1031 may convert the code into a correlated numerical value. For example, if a response variable indicates "normal" and "abnormal," by substituting 1 for "normal" and 0 for "abnormal," the feature-time-series influence-degree computation unit 1031 can use L1 logistic regression described in NPL 1 or a random forest classifier described in NPL 2 as a multivariate analysis method.

While, in the present exemplary embodiment, a plurality of sensors are assumed to be the analysis target devices 200 in a manufacturing process where a plurality of sensors are used to observe production conditions, such as, temperatures and gas flow rates, the analysis target system may be other system as long as the system can acquire system operation information and performance indexes corresponding to the system operation information.

For example, the analysis target system may be an IT system, a plant system, a structure, or transportation equipment. In the case of an IT system, a use rate and a use amount of computer resources, such as a CPU use rate, a memory use rate, and a disk access frequency, and a use rate and a use amount of communication network resources are used as operation information. As performance indexes, a consumption power amount and the number of times of arithmetic operations are used.

Example

The following will describe an example of the operation of the factor analysis device in the present exemplary embodiment with reference to FIGS. 3 to 9. The contents depicted in FIGS. 3 and 5 to 9 are numerical computation results based on actually performed operation.

The configuration of the factor analysis device 100 in the present example is the same configuration as depicted in FIG. 1. As depicted in FIG. 1, the process where the factor analysis device 100 is used in the present example is linked to a manufacturing process where two or more analysis target devices 200 are used. The analysis target device 200 is a device that is used in a manufacturing process.

As depicted in FIG. 1, the factor analysis device 100 includes the observation data collection unit 101, the feature-time-series conversion unit 102, the influence degree computation unit 103, the factor output unit 104, the time series storage unit 111, the feature-time-series storage unit 112, and the influence degree storage unit 113. The influence degree computation unit 103 includes the feature-time-series influence-degree computation unit 1031 and the explanatory-time-series influence-degree computation unit 1032. The time series storage unit 111 includes the explanatory-time-series storage unit 1111 and the response-time-series storage unit 1112. The influence degree storage unit 113 includes the feature-time-series influence-degree storage unit 1131 and the explanatory-time-series influence-degree storage unit 1132.

Next, an example of a method of generating a feature time series from an explanatory time series and a method of computing an influence degree thereof in the present example will be specifically described. First, a method of generating a feature time series from an explanatory time series will be specifically described.

Figure 3:
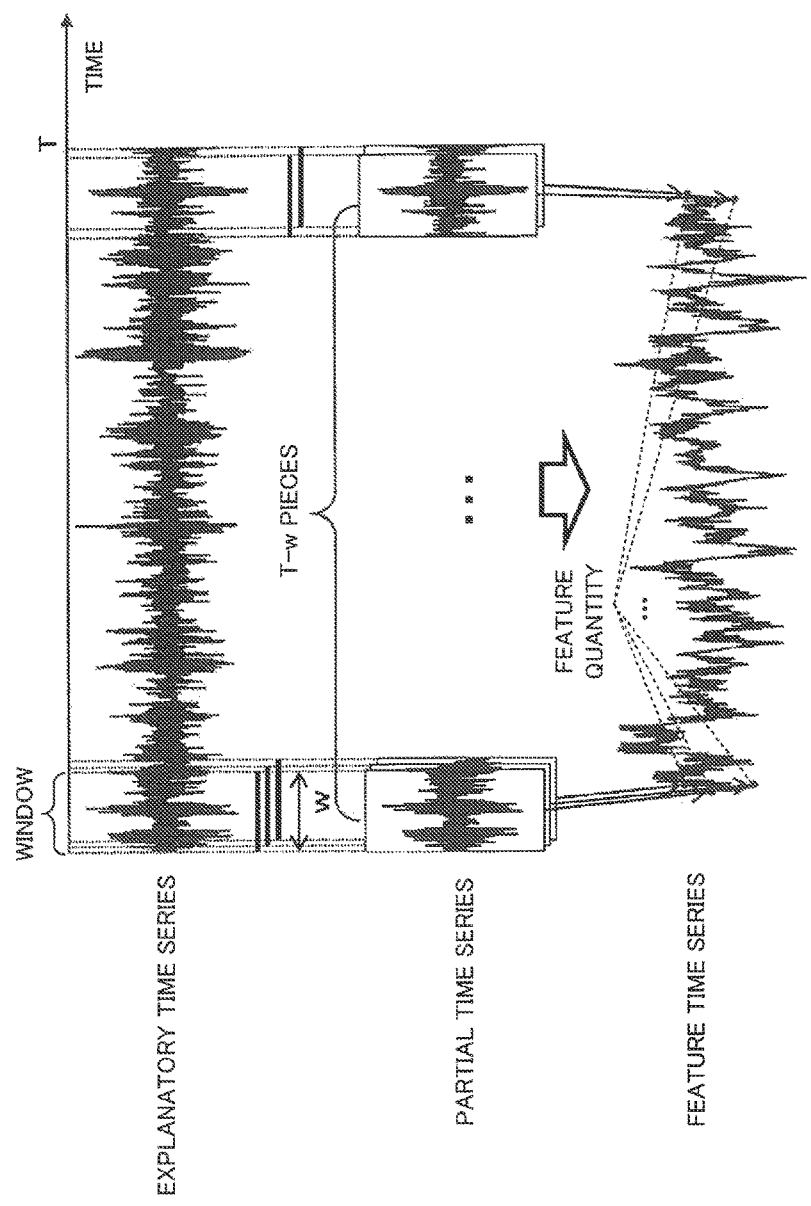
FIG. 3 is an explanatory diagram depicting an example of a method of generating a feature time series from an explanatory time series by a feature-time-series conversion unit 102.

FIG. 3 is an explanatory diagram depicting an example of a method of generating a feature time series from an explanatory time series by a feature-time-series conversion unit 102. FIG. 3 depicts an explanatory time series as a subject, partial time series as portions of the explanatory time series, and a feature time series that is generated based on feature quantities extracted from the partial time series.

The feature extraction unit 1021 retrieves an explanatory time series stored in the explanatory-time-series storage unit 1111. Next, the feature extraction unit 1021 retrieves data of a w time point portion from the start point from among the retrieved explanatory time series, and obtains a partial time series.

The feature extraction unit 1021 extracts one or more kinds of feature quantities from a partial time series corresponding to the retrieved window, and obtains the one or more kinds of feature quantities of real number values. As the feature quantities, the feature extraction unit 1021 may use a statistic amount, such as average and variance, an autoregression coefficient, a frequency distribution, a correlation coefficient with other explanatory time series, and the like.

After obtaining the feature quantities, the feature extraction unit 1021 moves the window by one time point portion ahead (right) and repeats the processing of feature extraction until the right end of the window reaches the end point. By processing of feature extraction by the feature extraction unit 1021, feature quantities of n kinds of T-w real number values can be obtained. Here, n is the number of kinds of feature quantities used.

The feature conversion unit 1022 converts the feature quantities into a feature time series by arranging the feature quantities of T-w real number values obtained by the feature extraction unit 1021 in time order. As is obvious from the conversion operation by the feature conversion unit 1022, in particular, if the feature quantities are converted into an average feature time series, the feature time series coincides with a time series obtained by moving average of the explanatory time series with width w.

The feature-time-series conversion unit 102 performs the above operation of the feature extraction unit 1021 and the operation of the feature conversion unit 1022 on all explanatory time series stored in the explanatory-time-series storage unit 1111, and obtains m×n feature time series. Here, m is the number of explanatory time series that are generation sources of the feature time series.

All the generated feature time series are labelled in a manner that enables recognition of explanatory time series as generation sources and the kinds of extracted features. For example, in the example depicted in FIG. 3, a feature time series, which is obtained by extracting feature quantities labelled as "a" from an explanatory time series labelled as "1," is labelled as "a::1" or the like.

Next, a method of computing an influence degree of a feature time series on a change in value of a response time series will be specifically described.

When assuming a response time series to be output and a feature time series correlated with the response time series, which is assumed to be output, to be input, and applying a known multivariate analysis method, an influence degree of the feature time series assumed to be input on the response time series assumed to be output can be computed based on the input and output relationship.

In the present example, the feature-time-series influence-degree computation unit 1031 computes a plurality of influence degrees of one feature time series using a plurality of multivariate analysis methods. The feature quantity is labelled in a form of, for example, "(name of feature quantity)::(name of explanatory time series)." For example, an influence degree is normalized so that the greatest value becomes 1 and the least value becomes 0.

Next, the explanatory-time-series influence-degree computation unit 1032 computes an influence degree of an explanatory time series on a response time series based on the influence degree of a feature time series computed by the feature-time-series influence-degree computation unit 1031.

In particular, the explanatory-time-series influence-degree computation unit 1032 sums the influence degrees of the feature time series for the multivariate analysis methods used and the explanatory time series that are sources of extraction of the feature quantities separately. The subjects to be summed may be all feature quantities, and may be only some of the feature quantities with higher influence degrees.

Next, the factor output unit 104 integrates the influence degrees of the explanatory time series on the response time series, which are computed by a plurality of multivariate analysis methods. In particular, the factor output unit 104 sums the influence degrees computed by a plurality of multivariate analysis methods for the explanatory time series separately. The method of summing may be simple summing or summing by weighting methods independently.

Figure 4:
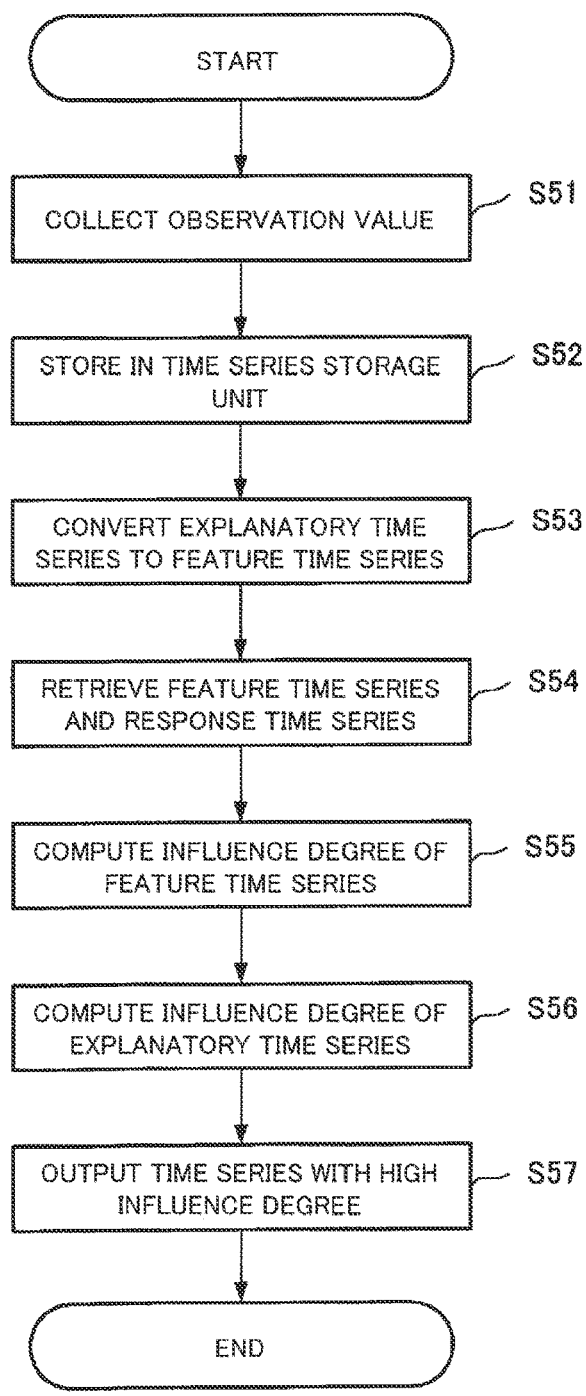
FIG. 4 is a flowchart depicting the operation of the factor analysis device 100.

The following will describe the operation of the factor analysis device 100 according to the present example. FIG. 4 is a flowchart depicting the operation of the factor analysis device 100.

The observation data collection unit 101 of the factor analysis device 100 collects 51 kinds of sensor observation values including sensor observation values that represent 50 kinds of production conditions and a sensor observation value that represents one kind of quality index from 51 analysis target devices 200 (step S51).

The observation data collection unit 101 generates 50 explanatory time series by separately arranging sensor observation values that represent 50 kinds of production conditions in time order. After generating the 50 explanatory time series, the observation data collection unit 101 stores the 50 explanatory time series in the explanatory-time-series storage unit 1111.

The observation data collection unit 101 generates one response time series by arranging the sensor observation values that represent the quality index in time order. After generating the one response time series, the observation data collection unit 101 stores the one response time series in the response-time-series storage unit 1112 (step S52).

Figure 5:
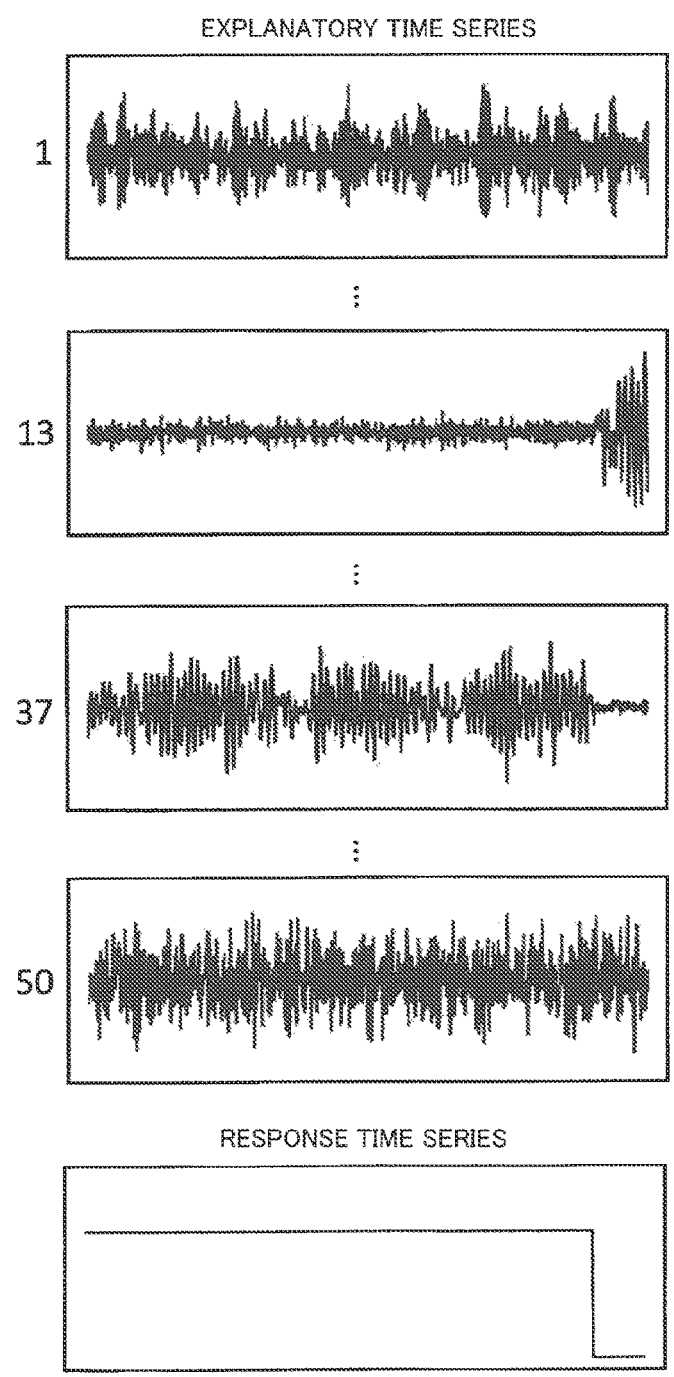
FIG. 5 is an explanatory diagram depicting an example of explanatory time series and a response time series stored in a time series storage unit 111.

FIG. 5 is an explanatory diagram depicting an example of the explanatory time series and the response time series stored in the time series storage unit 111. FIG. 5 depicts four explanatory time series which are labelled as "1," "13," "37" or "50" from among the 50 explanatory time series, and one response time series in the present example.

The explanatory time series labelled as "13" and the explanatory time series labelled as "37" in FIG. 5 are explanatory time series that are influence factors on the response time series among the 50 explanatory time series. The fact that these two explanatory time series are the influence factors is unknown for a user at the time when the processing of step S52 is performed.

The feature-time-series conversion unit 102 generates feature time series from all the explanatory time series (step S53). The feature-time-series conversion unit 102 generates a plurality of feature time series from each of the explanatory time series. The feature-time-series conversion unit 102 stores the generated feature time series in the feature-time-series storage unit 112.

Figure 6:
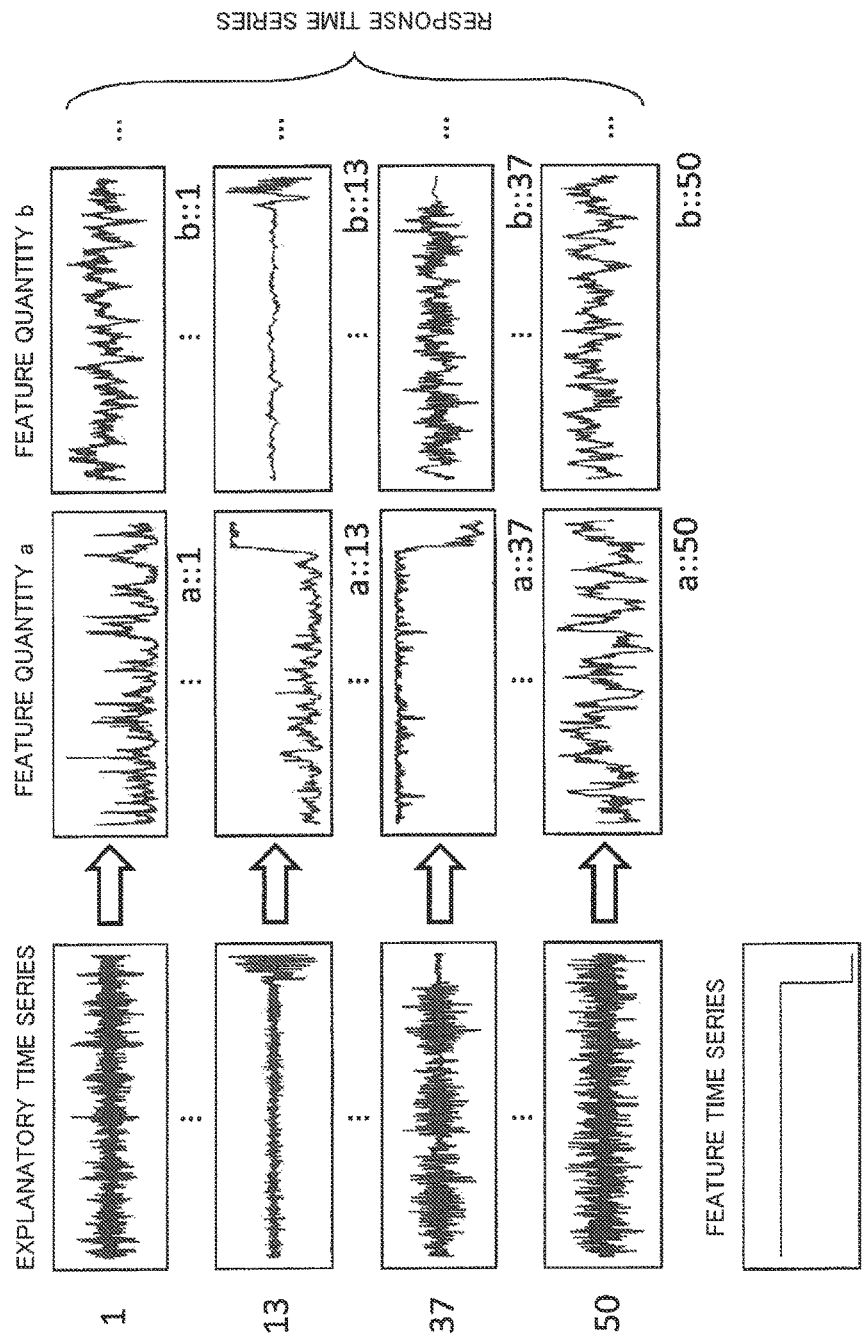
FIG. 6 is an explanatory diagram depicting a generated example of feature time series from each explanatory time series by the feature-time-series conversion unit 102.

FIG. 6 is an explanatory diagram depicting a generated example of the feature time series from each of the explanatory time series by the feature-time-series conversion unit 102. FIG. 6 depicts feature time series relating to a feature quantity a and a feature quantity b which are extracted from each of the four explanatory time series that are labelled as "1," "13," "37," and "50," respectively, and the response time series in the present example.

The feature time series depicted in FIG. 6 are labelled in a manner that enables recognition of the explanatory time series that are sources and the kinds of extracted feature quantities. For example, the feature time series that is obtained by extracting the feature quantity labelled as "a" from the explanatory time series labelled as "1" is labelled as "a::1."

The feature-time-series influence-degree computation unit 1031 retrieves the response time series from the response-time-series storage unit 1112 and the feature time series from the feature-time-series storage unit 112 (step S54). Next, the feature-time-series influence-degree computation unit 1031 computes influence degrees of the feature time series on the response time series by using one or more multivariate analysis methods (step S55). The feature-time-series influence-degree computation unit 1031 stores the computed influence degrees of the feature time series in the feature-time-series influence-degree storage unit 1131.

FIG. 7 is an explanatory diagram depicting computed examples of the influence degrees of the feature time series on the response time series by the feature-time-series influence-degree computation unit 1031 by using a plurality of multivariate analysis methods. FIG. 7 depicts influence degrees in the present example, which are computed separately by multivariate analysis methods of method I, method II, and method III. FIG. 7 depicts the feature time series in descending order of the computed influence degrees.

On the basis of the results of method I and method III depicted in FIG. 7, the feature quantity a is determined as an important feature quantity since it is understood that the influence degree on a change of the value of the response time series is large when a is extracted as a feature quantity.

The explanatory-time-series influence-degree computation unit 1032 retrieves the influence degrees of the feature time series on the response time series from the feature-time-series influence-degree storage unit 1131. Then, the explanatory-time-series influence-degree computation unit 1032 computes the influence degrees of the explanatory time series based on the information of the explanatory time series that are the source of extracting the feature quantities (step S56). The explanatory-time-series influence-degree computation unit 1032 stores the computed influence degrees of the explanatory-time-series in the explanatory-time-series influence-degree storage unit 1132.

FIG. 8 is an explanatory diagram depicting computed examples of the influence degrees of the explanatory time series on the response time series by the explanatory-time-series influence-degree computation unit 1032. FIG. 8 depicts the influence degrees computed by each of the multivariate analysis methods of method I, method II, and method III in the present example. FIG. 8 depicts the explanatory time series in descending order of the computed influence degrees.

The factor output unit 104 integrates the computed influence degrees of the explanatory time series, and outputs the explanatory time series with the high integrated influence degree as an influence factor (step S57). The factor output unit 104 outputs an important feature quantity from the computation results of the influence degrees of the feature time series. In this way, the factor analysis device 100 according to the present example ends the processing.

FIG. 9 is an explanatory diagram depicting a computed example of the influence degrees of the explanatory time series on a response time series by the factor output unit 104. The computation results depicted in FIG. 9 are the results that are finally obtained by computation of the factor analysis device 100 in the present example.

FIG. 9 depicts influence degrees obtained by integrating the influence degrees computed by each of the methods of method I, method II, and method III. FIG. 9 depicts the explanatory time series in descending order of the integrated influence degrees.

On the basis of the computation results of the influence degrees as depicted in FIG. 9, it is understood that the explanatory time series with the largest influence degree is the explanatory time series labelled as "13" and the explanatory time series with the second largest influence degree is the explanatory time series labelled as "37." In consideration of the above-described premise that the explanatory time series labelled as "13" and explanatory time series labelled as "37" are influence factors, it is understood that the explanatory time series that are strongly relating to a response time series are correctly output in the computation results of the influence degrees as depicted in FIG. 9.

As described above, FIG. 7 depicts the feature quantity a as an important feature quantity. Referring to the feature time series depicted in FIG. 6, it is understood that the feature quantity a largely changes at the point where the response time series changes. In particular, with regard to the feature time series "a::13" and feature time series "a::37" that are time series of the extracted feature quantity a as depicted in FIG. 6, the values largely change in conjunction with a change in the response time series.

Thus, according to the contents depicted in FIGS. 6 and 7, the feature quantity a is determined as an important feature quantity, from which a change in value of the response time series can be easily detected, thus, it is understood that the feature quantity a should be extracted from the explanatory time series in preprocessing.

According to the above result, the factor analysis device 100 in the present example can identify appropriate preprocessing and an explanatory time series relating to a change in value of a response time series on the basis of an explanatory time series data set, which is hard to analyze without preprocessing, and a response time series relating to the explanatory time series.

The factor analysis device according to the present exemplary embodiment is a factor analysis device that identifies an explanatory time series relating to a change factor of a response time series of a system based on one or more explanatory time series of the system, which are obtained by observing the state of the system that is a subject by one or more sensors, and the response time series which is explained by the explanatory time series. The factor analysis device can not only identify an explanatory time series that is a factor strongly relating to a change in value of the response time series but also provide information of preprocessing that is appropriate for analysis in identifying the explanatory time series, based on the explanatory time series data that needs appropriate preprocessing and the explanatory time series that are explained by the explanatory time series data. This is because feature quantities associated with an explanatory time series that is a factor of a change in value of response variables can be obtained and an explanatory time series that is a factor can be identified from a plurality of viewpoints by preparing many preprocessing candidates through extracting as many kinds of feature quantities as possible from explanatory time series and by computing influence degrees by a plurality of multivariate analysis methods.

Using the factor analysis device according to the present exemplary embodiment, appropriate preprocessing, in addition to an explanatory time series relating to a change in value of a response time series, can be identified from an explanatory time series data set that is hard to be analyzed without preprocessing and the response time series relating to the explanatory time series. The reason is that, because the feature quantity for which a large influence degree is computed in an analysis process is an important feature quantity that should be extracted from the explanatory time series in the factor analysis, extracting the feature quantity from the explanatory time series is preprocessing that should be applied to the explanatory time series.

Figure 10:
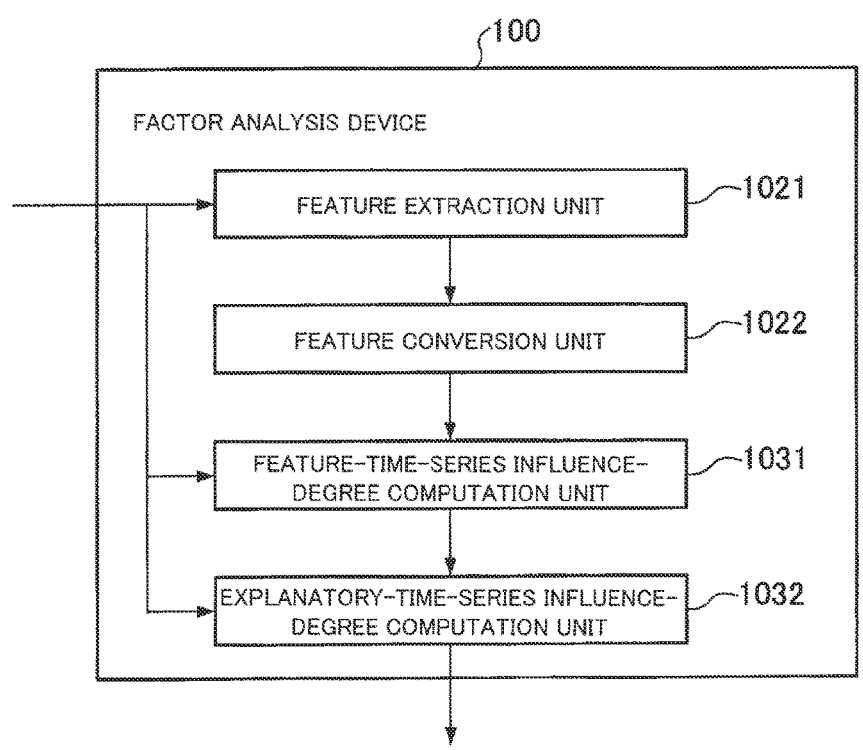
FIG. 10 is a block diagram depicting main units of a factor analysis device according to the present invention.

The following describes the main units of the present invention. FIG. 10 is a block diagram depicting the main units of the factor analysis device according to the present invention. As depicted in FIG. 10, the factor analysis device 100 according to the present invention includes, as main components: the feature extraction unit 1021 that extracts feature quantities from an explanatory time series; the feature conversion unit 1022 that converts the feature quantities into a feature time series; the feature-time-series influence-degree computation unit 1031 that computes influence degrees of the feature time series on a change in value of a response time series from the feature time series and the response time series; and the explanatory-time-series influence-degree computation unit 1032 that computes influence degrees of the explanatory time series on a change in value of the response time series based on the influence degrees of the feature time series.

Having such a configuration, the factor analysis device can elucidate appropriate preprocessing to be applied to explanatory time series of an analysis subject and identify an explanatory time series relating to a change in value of a response time series.

The feature extraction unit 1021 may extract a feature quantity from a partial time series, which is a portion of an explanatory time series, within a range of a window with a predetermined time range, and the feature conversion unit 1022 may convert the obtained feature quantities into a feature time series when the feature extraction unit 1021 extracts a feature quantities at positions by shifting the window by a predetermined number of time points from start time to end time of the explanatory time series and the window reaches the end time.

Having such a configuration, the factor analysis device can extract feature quantities from partial time series that are cut out by a window and convert the extracted feature quantities into a time series.

The factor analysis device 100 may include a factor output unit (for example, factor output unit 104) that outputs feature quantities relating to a feature time series with a large influence degree on a change in value of a response time series and an explanatory time series with a large influence degree on a change in value of the response time series.

Having such a configuration, the factor analysis device can provide feature quantities that should be extracted from explanatory time series of an analysis subject and information of an explanatory time series relating to a change in value of a response time series.

The feature extraction unit 1021 may extract one or more kinds of feature quantities from one or more explanatory time series, and the feature conversion unit 1022 may convert the feature quantities into a plurality of feature time series associated with the kinds of feature quantities.

Having such a configuration, the factor analysis device can prepare many candidates of preprocessing by extracting as many kinds of feature quantities as possible from explanatory time series.

The feature-time-series influence-degree computation unit 1031 may compute influence degrees of feature time series on a change in value of a response time series by using one or more multivariate analysis methods.

Having such a configuration, the factor analysis device can obtain a feature quantity related with an explanatory time series that is a factor of a change in value of a response variable and identify an explanatory time series that is a factor from a plurality of viewpoints.

The feature-time-series influence-degree computation unit 1031 may use L1 regularized logistic regression as one of the multivariate analysis methods.

The feature-time-series influence-degree computation unit 1031 may use a random forest classifier as one of the multivariate analysis methods.

The factor analysis device 100 may use any of average, standard deviation, skewness, kurtosis, and p-quartile for a feature quantity.

The factor analysis device 100 may use an autoregression model coefficient for a feature quantity.

The factor analysis device 100 may use a correlation coefficient with an explanatory time series for a feature quantity.

The factor analysis device 100 may use a frequency distribution of an explanatory time series for a feature quantity.

The present invention is described so far with reference to the above-described exemplary embodiments and examples without limitation thereto. A variety of modifications that will be understood by those skilled in the art can be made to the configuration and details of the present invention within the scope thereof.

This application claims priority based on Japanese Patent Application No. 2014-051096 filed on Mar. 14, 2014, which application is incorporated herein in its entirety by disclosure.

REFERENCE SIGNS LIST

100 Factor analysis device
101 Observation data collection unit
102 Feature-time-series conversion unit
1021 Feature extraction unit
1022 Feature conversion unit
103 Influence degree computation unit
1031 Feature-time-series influence-degree computation unit
1032 Explanatory-time-series influence-degree computation unit
104 Factor output unit
111 Time series storage unit
1111 Explanatory-time-series storage unit
1112 Response-time-series storage unit
112 Feature-time-series storage unit
113 Influence degree storage unit
1131 Feature-time-series influence-degree storage unit
1132 Explanatory-time-series influence-degree storage unit
200 analysis target device

The invention claimed is:

1. A factor analysis device comprising:
a memory that stores a set of instructions; and
at least one processor configured to execute the set of instructions to:
extract feature quantities from an explanatory time series representing conditions under which an analysis target device operates, the explanatory time series being sensor observation values measured by the analysis target device;
convert the feature quantities into a feature time series;
compute, from the feature time series and a response time series representing evaluation indexes of the analysis target device operating under the conditions represented by the explanatory time series, an influence degree of the feature time series on a change in value of the response time series, the response time series being observation values measured by the analysis target device; and
compute, based on the influence degree, an influence degree of the explanatory time series on the change in value of the response time series;
wherein the analysis target device is a device used in manufacturing process,
wherein the explanatory time series represent production conditions measured by the analysis target device, and
wherein the response time series represent the evaluation indexes of products manufactured under the production conditions.

2. The factor analysis device according to claim 1, wherein
the at least one processor is configured to:
extract a feature quantity for a partial time series within a region of a window that has a predetermined time range, the partial time series being a part of an explanatory time series, and
convert, when the feature extraction unit extracts the feature quantities at positions by shifting the window by a predetermined number of time points from start time to end time of the explanatory time series and the window reaches the end time, the extracted feature quantities into a feature time series.

3. The factor analysis device according to claim 1, wherein
the at least one processor is configured to:
output a feature quantity corresponding to a feature time series with a large influence degree on a change in value of the response time series and an explanatory time series with a large influence degree on a change in value of the response time series.

4. The factor analysis device according to claim 1, wherein
the at least one processor is configured to:
extract one or more kinds of feature quantities from one or more explanatory time series, and
convert the feature quantities into a plurality of feature time series corresponding to the kinds of the feature quantities.

5. The factor analysis device according to claim 1, wherein
the at least one processor is configured to:
compute influence degrees of a feature time series on a change of value of the response time series using one or more multivariate analysis methods.

6. The factor analysis device according to claim 5, wherein
the at least one processor is configured to:
use L1 regularized logistic regression as one of the multivariate analysis methods.

7. The factor analysis device according to claim 5, wherein
the at least one processor is configured to:
use a random forest classifier as one of the multivariate analysis methods.

8. A factor analysis method comprising:
extracting feature quantities from an explanatory time series representing conditions under which an analysis target device operates, the explanatory time series being sensor observation values measured by the analysis target device;

converting the feature quantities into a feature time series;

computing, from the feature time series and a response time series representing evaluation indexes of the analysis target device operating under the conditions represented by the explanatory time series, an influence degree of the feature time series on a change in value of the response time series, the response time series being observation values measured by the analysis target device; and computing, based on the influence degree, an influence degree of the explanatory time series on a change in value of the response time series;

wherein the analysis target device is a device used in manufacturing process, wherein the explanatory time series represent production conditions measured by the analysis target device, and wherein the response time series represent the evaluation indexes of products manufactured under the production conditions.

9. A factor analysis device comprising:

a memory that stores a set of instructions; and at least one processor configured to execute the set of instructions to:

extract feature quantities from an explanatory time series representing conditions under which an analysis target device operates, the explanatory time series being sensor observation values measured by the analysis target device;

convert the feature quantities into a feature time series;

compute, from the feature time series and a response time series representing evaluation indexes of the analysis target device operating under the conditions represented by the explanatory time series, an influence degree of the feature time series on a change in value of the response time series, the response time series being observation values measured by the analysis target device; and compute, based on the influence degree, an influence degree of the explanatory time series on the change in value of the response time series;

wherein the analysis target device is an internet technology (IT) system, wherein the explanatory time series represent operation information of the IT system, the operation information being use rate or use amount of computer resources, and wherein the response time series represent the evaluation indexes that are performance indexes, the performance indexes being consumption power amount of number of times of arithmetic operations.

* * * * *